Oct. 20, 1931.  G. B. REED  1,828,340
HUB CONSTRUCTION
Filed Sept. 3, 1929  3 Sheets-Sheet 1

INVENTOR.
GEORGE B. REED
BY
ATTORNEY.

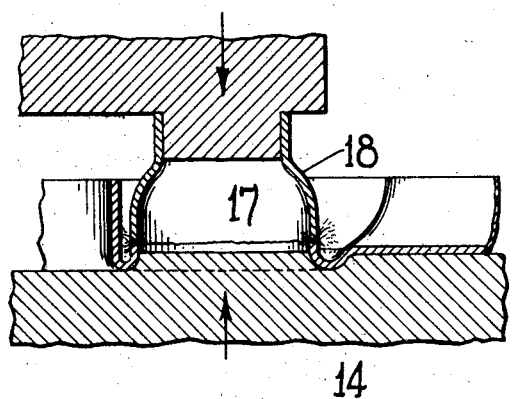
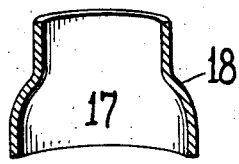
FIG.4  FIG.5
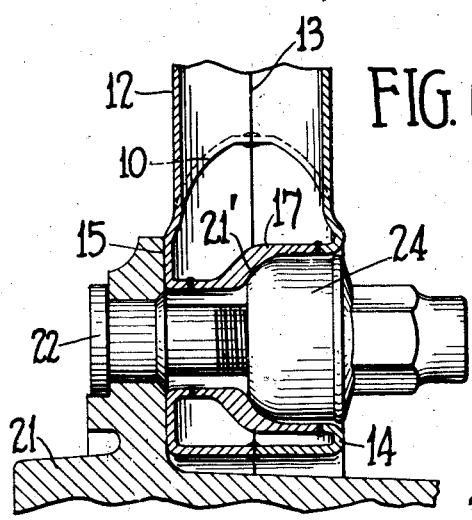
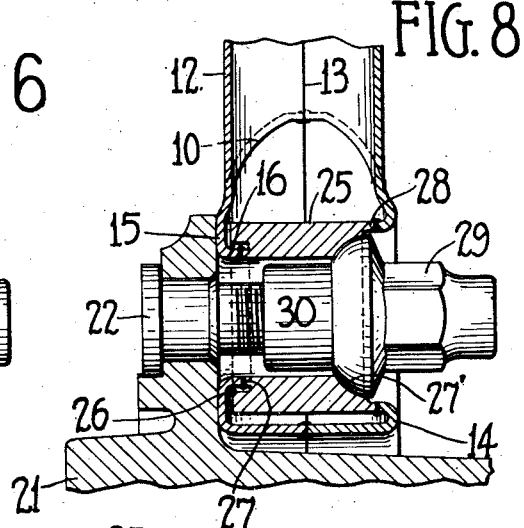
FIG.6  FIG.8
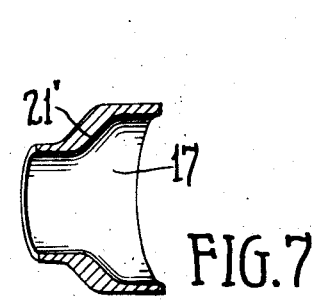
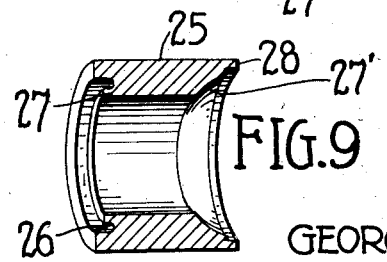
FIG.7  FIG.9

Oct. 20, 1931.  G. B. REED  1,828,340
HUB CONSTRUCTION
Filed Sept. 3, 1929   3 Sheets-Sheet 3
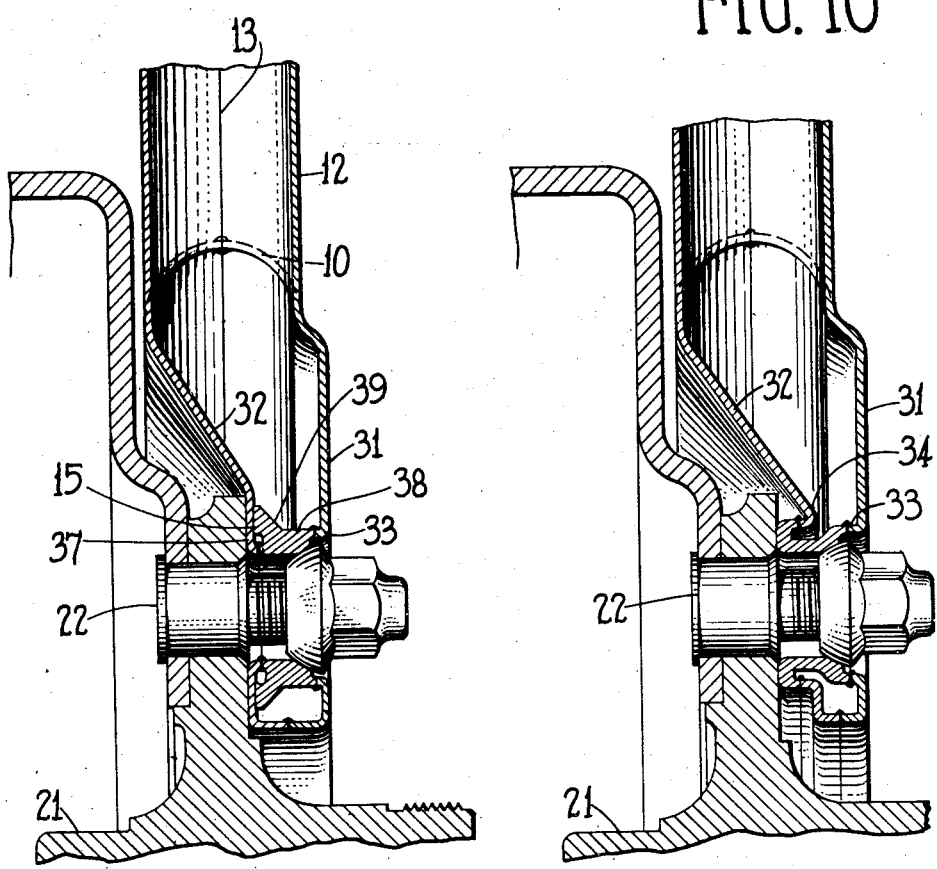
FIG. 10
FIG. 11
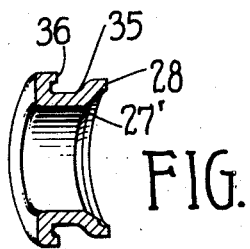
FIG. 12
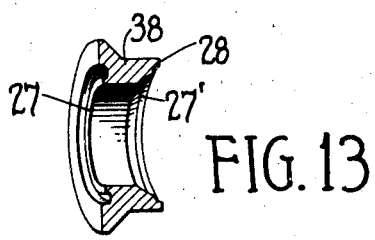
FIG. 13
*INVENTOR.*
GEORGE B. REED.
BY
*ATTORNEY*

Patented Oct. 20, 1931

1,828,340

UNITED STATES PATENT OFFICE

GEORGE B. REED, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

HUB CONSTRUCTION

Application filed September 3, 1929. Serial No. 390,002.

My invention has as its object the rigid, sturdy and durable construction of the bolt hole portions of sheet metal hub structures.

A further object is to render such hub structures non-distortable by the securing means, thereby to prevent misalignment and insecurity. A still further object is a construction admitting securement of such wheels in place by the same studs and nuts by which the relatively thinner hubs of wire and disc wheels are secured in place.

These objects and yet further advantages I attain by forming the bolt hole structures of tubes integrally connecting the opposed faces of the hub structure, by flash welding these tubes in integral extension of the faces themselves, by appropriately reinforcing the tubes to take the strain of the securing nuts, and providing them with a flare within the body of the hub itself whereby the securing nuts may be housed in part at least within the bolt hole and seat upon the flare itself.

In the accompanying drawings I show the best embodiment of my invention now known to me, and in the following description, describe its best adaptation. Quite obviously, however, it is susceptible of other embodiments, of modifications, and of other adaptations and utilities.

Of the drawings,

Fig. 4 is a detail sectional view showing a step in the forming of the wheel prior to that shown in Fig. 3.

Fig. 5 shows a longitudinal sectional view of a tube before welding it in place.

Figs. 6 and 8 are views similar to Fig. 2 showing modifications.

Figs. 7 and 9 are views similar to Fig. 5 showing modified tubes entering into the construction of Figs. 6 and 8, respectively.

Figs. 10 and 11 are partial radial sections of additional modifications.

Figs. 12 and 13 are details of the bolt hole thimbles applying respectively to Figs. 10 and 11.

The hub is a hollow sheet metal hub structure of a sheet metal artillery type wheel body 11 comprised of the hub 10 and radial spokes 12. Such sheet metal wheel bodies are now formed by flash welding together two metal stampings each constituting one half of the wheel body, in the medial plane of tread 13 of the wheel.

Figure 1:
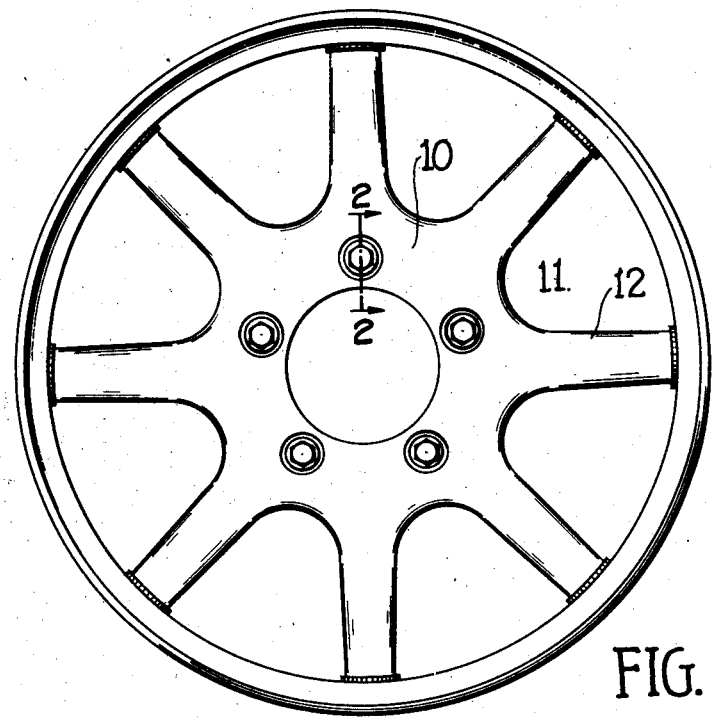
Figure 1 is a side elevation of a wheel having a hub embodying my invention.
Figures 2, 3:
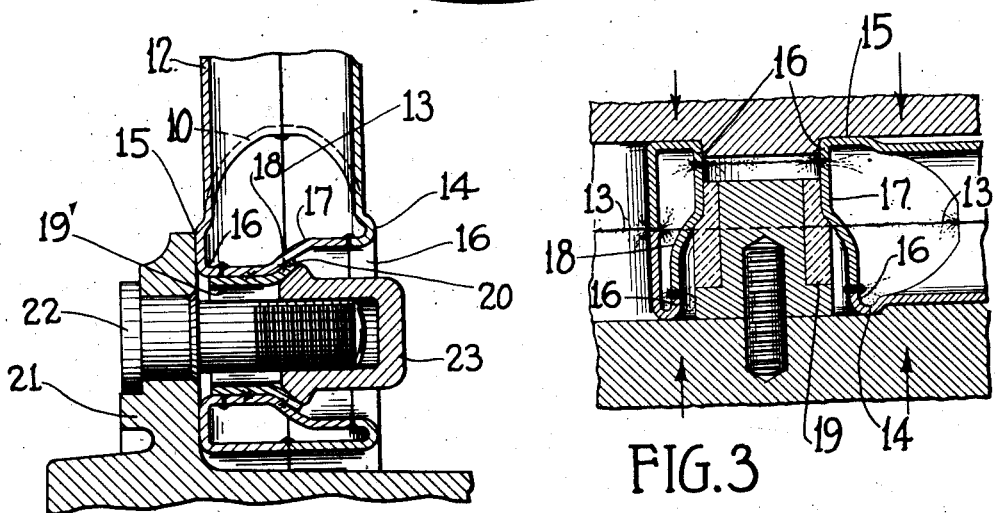
Fig. 2 is an enlarged radial cross section of one side of such a hub taken on line 2—2 of Fig. 1, looking in the direction of the arrows.
Fig. 3 shows in section one bolt hole portion in the welding machine.

Prior to this flash welding operation and in the die stamping operation in which the halves of the wheel body are formed, I outwardly offset the opposed faces of the hub portion 10, as indicated at 14 and 15. In the same or subsequent die stamping operations, I pierce holes in the hub portion and inwardly turn about their margins flanges 16. The flange 16 of the inner part is of less diameter than the flange 16 of the outer part. Between these flanges 16 I interpose for each bolt hole a tube 17 having a flare 18 intermediate its ends, and the diameters of its ends substantially equal to the diameters of the flanges 16, the inner the smaller, the outer the greater. This tube originally is of somewhat greater length than necessary to reach between the inturned flanges 16, and indeed, the flanges 16 themselves are somewhat deeper than necessary to effect joinder with the tube 17, whereby both the tube 17 and the flanges 16 may be burned off by flash welding in assembly. All the tubes 17 are welded to one half stamping of the wheel by a flash welding operation as indicated in Fig. 4. In the operation of flash welding together the parts of the body 11, I assemble together the two parts of the wheel body, the one with the tubes 17 already welded to it as indicated in Fig. 3, which is a section of the same portion of the wheel shown in Fig. 2. The parts are moved into electro contact and at the same time that the parts of the main body in the medial plane 13 are welded together, the flanges 16 of the other half of the wheel are welded to the tube 17. The tube 17 is aligned by an arbor 19 constituting a part of the welding jig or dies.

After the joints between the flanges 16 and the tube 17 are cleaned up, a reinforcing tube 19' having a flare 20 and complemental to the flare of tube 17 and its portion of smaller diameter, is forced home within tube 17 into the position shown in Fig. 2, and retained therein either by the force fit or by the force fit plus spot welding in the flare 20 or at other points.

The completed structure is bolted to the main hub flange 21 by studs 22 and nuts 23. The cap nuts 23 are of the ball-faced type. Their main bodies are accommodated within the bolt holes constituted by tubes 17 and the associated structure, and their ball heads seat on the flare structure 18—20. There is sufficient clearance between tubes 17 and the heads of the nuts to receive the side walls of the socket wrench.

The tubes 17 may be modified as shown in Fig. 6 by forming the thickened reinforcement at the flare 21' as an integral part of the tube. Such tubes with thickened portions at the flare, shown separately in Fig. 7, may be made by forging or machining. In both of the constructions shown in Fig. 2 and Fig. 6, I may, if desired, close the space between the nut and the wall of the hole by enlarging the body of the nut, as shown at 24 in Fig. 6, to substantially fill the outer end of the hole, the wrench receiving part of the nut, in such case, projecting beyond the face of the wheel. The tube may also take the form of a length of relatively heavy straight tubing 25, as shown in Figs. 8 and 9, one end of which is formed with an annular groove 26, providing an inner annular flange 27 of substantially the gauge of the wheel half stamping, and adapted to be welded to a flange 16 of one of said halves, and the other end is formed inwardly with a seat 27' complemental to the ball seat of a nut and outwardly with an annular flange 28 adapted to be welded to the outer half of the wheel. The nut 29 may in this case be provided with a threaded skirt 30, to obtain a securer engagement with the stud, which is of the short length used in connection with wire and disc wheels.

In this simple structure I have attained all the objects of my invention. Simplicity, strength, sturdiness, durability, perfect alignment, freedom from distortion, securing and general adaptability to standard bolt and nut securement, are found to be hand in hand advantageous.

My invention is susceptible of numerous modifications as would appear already to have been shown. But two others are shown in Figs. 10 to 13. These modifications are particularly adapted for thin hubs for securement without modification by the same studs and nuts with which disc wheels are attached. Disc wheels, it will be remembered, have very relatively shallow central portions for attachment to hub flanges.

The modification of Figs. 10 to 12 consist in offsetting outwardly the outer stamping of the wheel at 31 and offsetting inwardly in conical form the inner portion 32 of the inner stamping. Around the bolt holes the outer stamping is then turned inwardly as at 33 and the inner stamping also turned inwardly as at 34 but on a diameter greater by at least twice the gauge of the metal within the diameter of the portion 33. An interconnecting thimble 35 (Fig. 12) of relatively short length is flash welded to the portions 33—34. To facilitate this flash welding the seat portion 27' is provided with the projecting flange 28 used in other modifications, particularly that of Fig. 8, while the inner end is reversely directed and provided with an outturned welding flange or bead 36 essentially similar to 28. But while flange 28 is of the diameter of the part 33, flange 36 is of the diameter of the part 34, thereby the thimble 35 may be flash welded into place after stampings which compose the body of the wheel have been flash welded together, the portion 28 entering and passing through the portion 34 freely.

The modification of Figs. 11 and 13 is similar in respect to the offset central portions 31—32 and the inturned flanges 33 around the bolt holes. But the portion 32 is outturned about the bolt holes as at 37. The thimble 38 is provided with a welding bead 28 complemental to the flange 33 and adjoining its seat portion 27'. On its inner end it is provided with a bead 27 essentially similar to the bead of the same number of the form of Figs. 8 and 9, and, as in that case, of less diameter than the bead 28. This thimble 38 is likewise flash welded by beads 27 and 28 to the bolt hole flanges 33 and 37. But both welds are internal to the structure and not therefore to be made at the time the stampings of the body of the wheel are flash welded together. The thimbles are provided with a laterally extending skirt 39 emanating inwardly of the bead 27 and projected into supporting contact with the inner face 15 of the portion 32 continguous to the hub flange.

It will be understood, of course, that various changes in the invention may be made from time to time without departing from the real spirit or principles thereof and it is accordingly intended to claim the same broadly, as well as specifically, as indicated by the appended claims.

What I claim and desire to secure by Letter Patent is:

1. A sheet metal wheel including a hollow nave portion having opposite sides provided with bolt receiving openings and reinforcing thimbles received within said bolt receiving openings and inter-connecting the opposite sides of the wheel, said thimbles being flared intermediate their ends to provide a nut receiving seat within the hollow nave portion of the wheel.

2. A vehicle wheel including a nave portion of substantial thickness having bolt receiving openings passing therethrough, and a plurality of reinforcing thimbles connecting opposite sides of the nave portion and each having a flared portion intermediate its ends adapted to receive securing nuts.

3. The method of making a hollow pressed metal nave structure having bolt holes therein and reinforcing thimbles interconnecting the opposite sides thereof which consists in forming two opposed stampings conformed to the opposite sides of the nave to be produced with flanged bolt holes, welding tubes to the flanges of one of said stampings and thereafter welding together the opposed stampings and simultaneously welding the tubes to the flanges of the second stamping.

In testimony whereof I hereunto affix my signature.

GEORGE B. REED.